US012681818B2

(12) United States Patent
Mano

(10) Patent No.: US 12,681,818 B2
(45) Date of Patent: Jul. 14, 2026

(54) METHOD AND SYSTEM FOR PERFORMING ANOMALY DETECTION ON OPERATIONAL TECHNOLOGY NETWORK

(71) Applicant: Accenture Global Solutions Limited, Dublin (IE)

(72) Inventor: Vicknesh Mano, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 8 days.

(21) Appl. No.: 18/936,336

(22) Filed: Nov. 4, 2024

(65) Prior Publication Data

US 2026/0127084 A1 May 7, 2026

(51) Int. Cl.
*G06F 11/22* (2006.01)
(52) U.S. Cl.
CPC ................................. *G06F 11/2257* (2013.01)
(58) Field of Classification Search
CPC .................................................. G06F 11/2257
USPC .......................................................... 714/26
See application file for complete search history.

(56) References Cited

U.S. PATENT DOCUMENTS

2018/0034834 A1* 2/2018 Mitchell ............. H04L 63/1416
2025/0039134 A1* 1/2025 Roquemore ........ H04L 63/0236

OTHER PUBLICATIONS

He, et al., "Deep-Feature-Based Autoencoder Network for Few-Shot Malicious Traffic Detection," Hindawi Security and Communication Networks, vol. 2021, Article ID 6659022, Mar. 2021, 13 pages.
Anonymous, "Monitoring OT Infrastructure," Corso System 2024, 6 pages, [https://corsosystems.com/posts/monitoring-ot-infrastructure].
Rajapkar, et al., "Design of Intrusion Prevention System for OT Networks Using Deep Neural Networks," IEEE Xplore, Oct. 15, 2020 11th International Conference on Computing, Communication and Networking Technologies (ICCCNT), pages.
Ollila, Tommi, "Overview for capabilities of OT network monitoring tools," JAMK University of Applied Sciences, Master's thesis, Apr. 2024, Technology Master's Degree Programme in Cyber Security, 66 pages.
Mahrenholz, et al., " Detecting Low-Level Attacks on Wireless OT Networks," the 5th IEEE International Symposium on Smart and Wireless Systems within the International Conferences on Intelligent Data Acquisition and advanced Computing Systems, Sep. 17-18, 2020, Dortmund, Germany, 6 pages.

* cited by examiner

*Primary Examiner* — Yair Leibovich
(74) *Attorney, Agent, or Firm* — Seed Intellectual Property Law Group LLP

(57) ABSTRACT

A method, system, and computer-readable storage media for anomaly detection on an Operational Technology (OT) network are disclosed. Input packets are obtained. Each of the input packets may represent a history of baseline packets. Based on the input packets, a foundation model is trained to generate corresponding recreated packets. The trained foundation model is optimized by minimizing a difference between the input packets and the corresponding generated recreated packets. Further, an incoming data packet is received on the OT network. Based upon the incoming data packet, a recreated data packet is generated using the trained and optimized foundation model. A difference between the recreated data packet and the incoming data packet is calculated. If the difference is above a predetermined threshold, a security protocol is triggered to a security system.

20 Claims, 14 Drawing Sheets

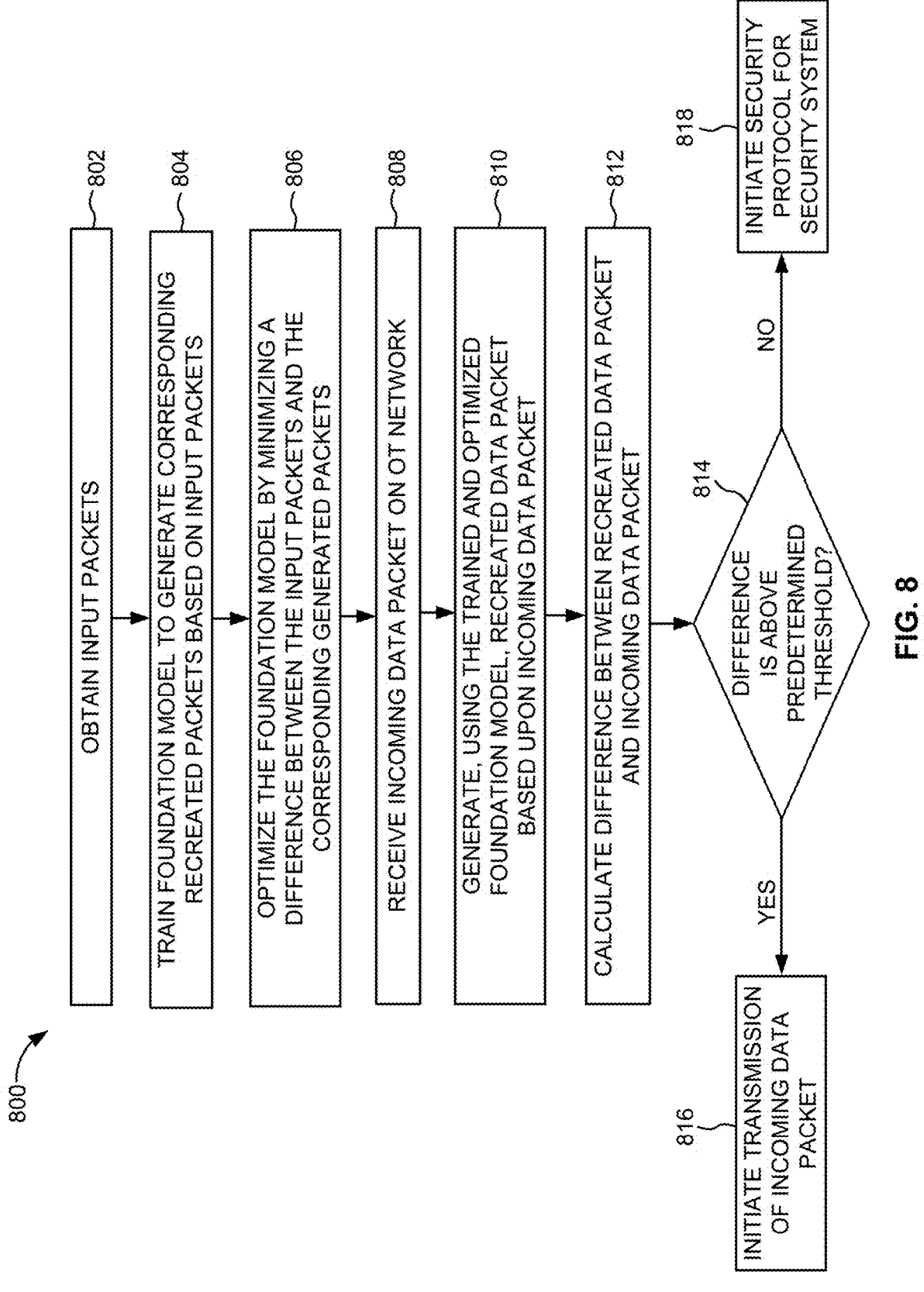

800

802 OBTAIN INPUT PACKETS

804 TRAIN FOUNDATION MODEL TO GENERATE CORRESPONDING RECREATED PACKETS BASED ON INPUT PACKETS

806 OPTIMIZE THE FOUNDATION MODEL BY MINIMIZING A DIFFERENCE BETWEEN THE INPUT PACKETS AND THE CORRESPONDING GENERATED PACKETS

808 RECEIVE INCOMING DATA PACKET ON OT NETWORK

810 GENERATE, USING THE TRAINED AND OPTIMIZED FOUNDATION MODEL, RECREATED DATA PACKET BASED UPON INCOMING DATA PACKET

812 CALCULATE DIFFERENCE BETWEEN RECREATED DATA PACKET AND INCOMING DATA PACKET

814 DIFFERENCE IS ABOVE PREDETERMINED THRESHOLD?

YES

816 INITIATE TRANSMISSION OF INCOMING DATA PACKET

NO

818 INITIATE SECURITY PROTOCOL FOR SECURITY SYSTEM

FIG. 8

METHOD AND SYSTEM FOR PERFORMING ANOMALY DETECTION ON OPERATIONAL TECHNOLOGY NETWORK

TECHNICAL FIELD

Various examples described herein relate generally to computer-implemented method, system, and computer program product for performing anomaly detection on an Operational Technology (OT) network.

BACKGROUND

Operational Technology (OT) networks play a crucial role in industrial environments such as manufacturing, energy, transportation, utilities, and/or the like, where real-time operations are critical. An OT network may include Industrial Control Systems (ICSs) for monitoring and controlling physical processes, devices, and infrastructure. Further, an ICS system may include a combination of personal computing systems and specialized hardware like Programmable Logic Controllers (PLCs). The PLCs may be employed as a bridge between a communication network and one or more non-networking equipment such as valves, sensors, motors, access cards, and/or the like.

SUMMARY

Implementations of the present disclosure provide accurate and actionable security monitoring tools to an Operational Technology (OT) network by enabling anomaly detection on the OT network using a trained and optimized foundation model.

In at least one example, the present disclosure provides a computer implemented method for anomaly detection on an Operational Technology (OT) network. The method may include obtaining a plurality of input packets. Each of the plurality of input packets may represent a history of baseline packets. Based on the plurality of input packets, the method may include training a foundation model to generate a plurality of corresponding recreated packets. Each of the plurality of corresponding recreated packets is based on a unique one of the plurality of input packets. The method may include optimizing the foundation model by minimizing a difference between the plurality of input packets and the plurality of corresponding generated packets. The method may further include receiving an incoming data packet on the OT network. The method may include generating, using the trained and optimized foundation model, a recreated data packet based upon the incoming data packet. The method may include calculating a difference between the recreated data packet and the incoming data packet. The method may include determining if the difference is above a predetermined threshold. When the difference is above the predetermined threshold, the method may include triggering a security protocol.

The present disclosure further describes a system for implementing the method provided herein. The present disclosure also describes computer-readable storage media coupled to one or more processors and having instructions stored thereon which, when executed by the one or more processors, cause the one or more processors to perform operations in accordance with the method described herein.

It is appreciated that method in accordance with the present disclosure can include any combination of the aspects and features described herein. That is, the method in accordance with the present disclosure is not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE FIGURES

Various examples in accordance with the present disclosure will be described with reference to the drawings, in which:

FIG. 8 is a flow diagram that presents an example method for performing anomaly detection on the OT network, in accordance with implementations of the present disclosure.

Like reference numbers and designations in the various drawings indicate like elements.

DETAILED DESCRIPTION

Figure 1A:
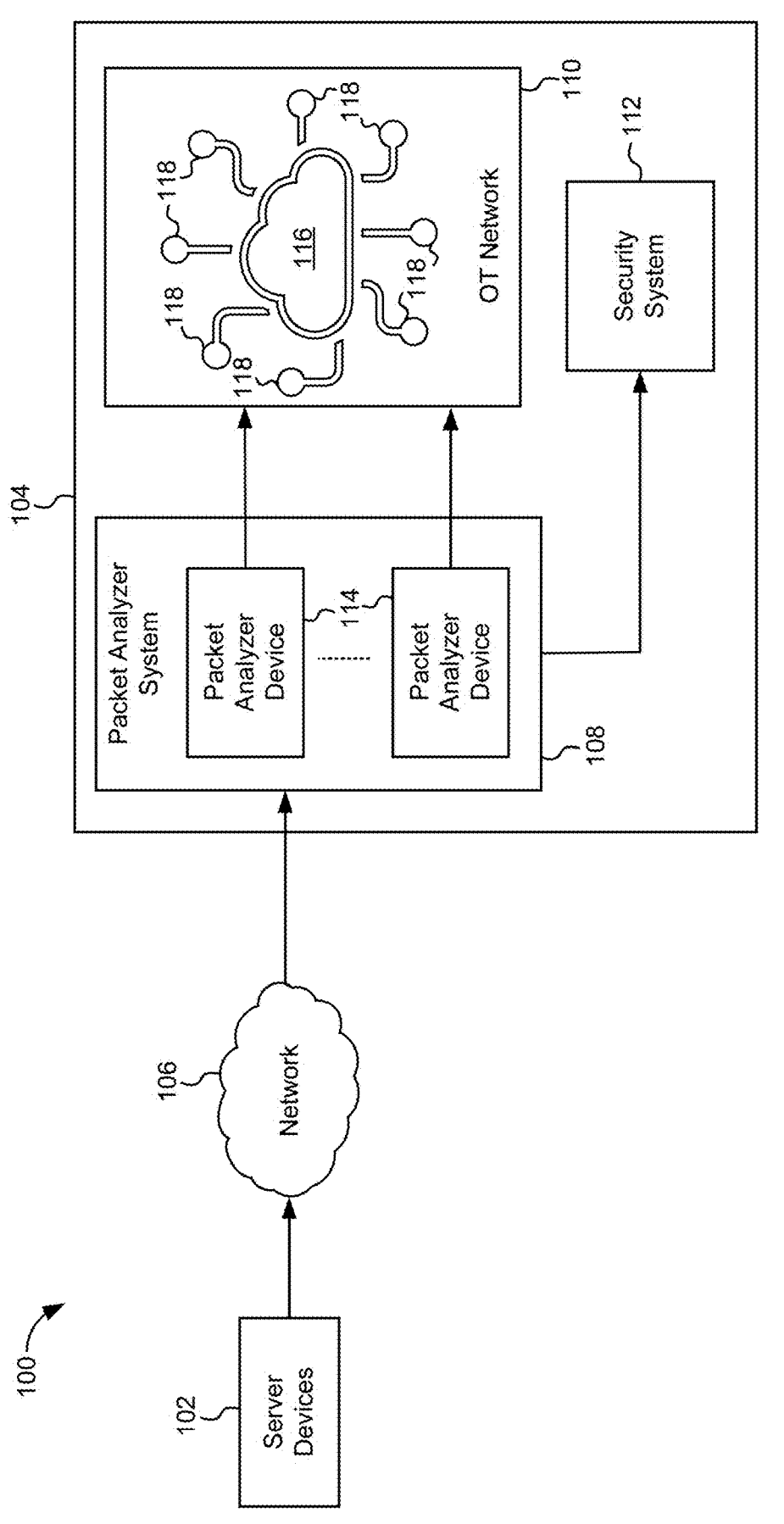
FIGS. 1A-1G depict an example environment that may be used to execute implementations of the present disclosure.

In the following description, various examples will be illustrated by way of example and not by way of limitation in the figures of the accompanying drawings. References to various examples in this disclosure are not necessarily to the same example, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Reference to any "example" herein (e.g., "for example", "an example of", by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various examples given in this specification.

Without intent to limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series and the like.

The term "a" means "one or more" unless the context clearly indicates a single element.

"First," "second," etc., re labels to distinguish components or blocks of otherwise similar names but does not imply any sequence or numerical limitation.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of examples. However, it will be understood by one of ordinary skill in the art that examples may be practiced without these specific details. For example, systems may be shown in block diagrams so as not to obscure the examples in unnecessary detail. In other instances, well-known processes, structures, and techniques may be shown without unnecessary detail in order to avoid obscuring example examples.

The specification and drawings are to be regarded in an illustrative rather than a restrictive sense. It will, however, be evident that various modifications and changes may be made thereunto without departing from the broader spirit and scope as set forth in the claims.

This disclosure should be interpreted according to the exemplary definitions provided below. In case of a contradiction between the definitions in the definitions section and other sections of this disclosure, this section should prevail. In case of a contradiction between the definitions in this section and a definition or a description in any other document, including in another document incorporated in this disclosure by reference, this section should prevail, even if the definition or the description in the other document is commonly accepted by a person of ordinary skill in the art.

"Input packets" and the like may refer to baseline or historical data packets collected over time and used for training of a foundation model.

"Incoming data packets" and the like may refer to data packets or data traffic received on an Operational Technology (OT) network in a real-time.

"Trusted data packets" and the like may refer to data packets that are not vulnerable to cause any security threats or cyber-attacks on the OT network. For example, the trusted data packets may include legitimate or safe data.

"Anomalous data packets" and the like may refer to data packets that are vulnerable to cause a security threat or a cyber-attack on the OT network. For example, the anomalous data packets may include malicious data directing to an illegitimate network resource (e.g., a webpage, a website, and/or the like).

An Operational Technology (OT) network may be utilized to implement automatic control of industrial processes. The OT network may include Industrial Control Systems (ICSs) and multiple non-networking equipment. Each of the ICSs may be utilized to monitor and control one or more of the multiple non-networking equipment, as the non-networking equipment do not directly connect to Internet sources/communication network. However, as the OT network becomes more connected and relies on a physical security, the OT network may be vulnerable to security threats or cyber-attacks, while causing threat intelligence-based detection using Indicators of Compromise (IOCs) (e.g., Internet Protocols (IPs), domains, Uniform Resource Locators (URLs)) ineffective. For example, data packets received on the OT network may be vulnerability points for the OT network, as the data packets may include malicious codes and setpoint commands for components (e.g., the ICSs and the multiple non-networking equipment) of the OT network. Therefore, the security threats or cyber-attacks on the OT network may be avoided by effectively inspecting or evaluating the data packets received on the OT network.

Various methods/approaches are employed for inspecting the data packets received on the OT network. A rule-based method is commonly used. In accordance with the rule-based method, payloads of the data packets are deciphered and inspected against rules generated based on known security threat patterns. The payloads of the data packets are inspected against the rules using Artificial Intelligence (AI) models. If the data packets are determined to be deviating from the rules, the data packets may be considered as anomalous data packets, and accordingly security alerts may be generated. However, if new or unknown security threat patterns occurred, new rules are required to be extracted making it difficult for the rule-based method to identify the anomalous data packets with unstable rules. Therefore, the rule-based method may be effective against the known security threat patterns, however, the rule-based method may lack efficacy against the unknown security threat patterns. Further, as the payloads of the data packets include hexadecimal data with long sequence patterns, the payloads of the data packets may be complex to decipher for the rules due to availability of various proprietary and legacy protocols. Due to which, efficacy/scope of the rules to the payloads of the data packets may be limited. Further, the long sequence patterns in the payloads of the data packets may be out of reach (due to memory/attention limits) of the AI models. Therefore, inspection of the data packets using the AI models may lack accuracy and efficiency.

In addition, false positive and false negative security alerts may be generated, as the rules used for inspecting the data packets are unstable. The false positive and false negative security alerts may cause one or more of: true security alerts to be missed, the true security alerts to be overlooked or ignored due to lack of confidence in the data packets, information overload to an analyst, and an outright misinterpretation of significance of the security alerts and sequencing of the security alerts. Therefore, using the rule-based method for inspecting the data packets on the OT network may increase usage of computing resources, networking resources, human resources, and/or the like, associated with generating the false positive and false negative security alerts, unnecessarily addressing the false positive and false negative security alerts, handling industrial process disruptions caused by the false positive and false negative security alerts and/or undetected actual security issues, and/or the like.

Implementations of the present disclosure enable accurate and effective anomaly detection on the OT network using a foundation model. The foundation model may be trained and optimized based on a large volume of historical baseline data packets. Further, the trained and optimized foundation model may be used to inspect or evaluate data packets received on the OT network in real-time and flag out suspicious/anomalous data packets based on recreation of the data packets and difference calculation. Therefore, the anomalous data packets may be detected accurately. With the accurate detection of the anomalous data packets, true security alerts may be generated with reduced computing resources, time consumption, and manual effort. The true security alerts may further remediate security threats or cyber threats on the OT network, or misconfigurations, and malfunctions in the OT network.

FIGS. 1A-1G depict an example environment 100 that may be used to execute implementations of the present disclosure. The example environment 100, shown in FIG. 1A, includes server devices 102 and a system 104. The server devices 102 and the system 104 may communicate with each other using a network 106. In some examples, the network 106 may include a Local Area Network (LAN), a Wide Area Network (WAN), the Internet, or a combination thereof. In some examples, the network 106 may be accessed over a wired and/or a wireless communication link.

The server devices 102 may include communication devices and/or computing devices. For example, each of the server devices 102 may include a server such as an application server, a client server, a web server, a database server, a host server, a proxy server, a virtual server (e.g., executing on a computing hardware), or a server in a cloud computing system.

The system 104 includes a packet analyzer system 108, an Operational Technology (OT) network 110, and a security system 112.

The packet analyzer system 108 includes one or more packet analyzer devices 114. In the present disclosure, packet analyzer devices 114 may also be referenced to as Generative Artificial Intelligence (Gen AI) Packet Inspectors (GDPIs). The one or more packet analyzer devices 114 may be arranged within strategic network locations across the OT network 110. In some examples, the one or more packet analyzer devices 114 may include internal/external servers, quantum computers, desktops, laptops, smartphones, tablets, and/or the like.

The OT network 110 may be used to monitor and control physical processes, devices, and infrastructure. Examples of the OT network 110 may include an industrial control system, a building automation system, a supervisory control and data acquisition system, an Internet of Things (IoT) system, a vehicle control system, and/or the like. The OT network 110 includes a controller 116 and one or more non-networking equipment 118 connected to the controller 116. Examples of the controller 116 may include one or more components such as, Programmable Logic Controllers (PLCs), programming terminals, automation controllers, Input/Output (I/O) modules, communication networks, Human-Machine Interface (HMI) terminals, and/or the like. Examples of the one or more non-networking equipment 118 may include one or more components such as, valves, motors, sensors, access cards, computing assets, instrumentation, actuators/pumps, conveyor belts, and/or the like. The one or more non-networking equipment 118 may be connected to the network 106 through the controller 116.

The security system 112 may be associated with one or more security monitoring entities or a security team. In some examples, the security system 112 may include one or more computing devices, which may be executed within a cloud computing environment. In some other examples, the security system 112 may include a standalone server or another type of computing device that are not part of the cloud computing environment.

The packet analyzer system 108 and the security system 112 are described in detail below by considering a single packet analyzer device 114 of the packet analyzer system 108 for simplicity.

Figure 1B:
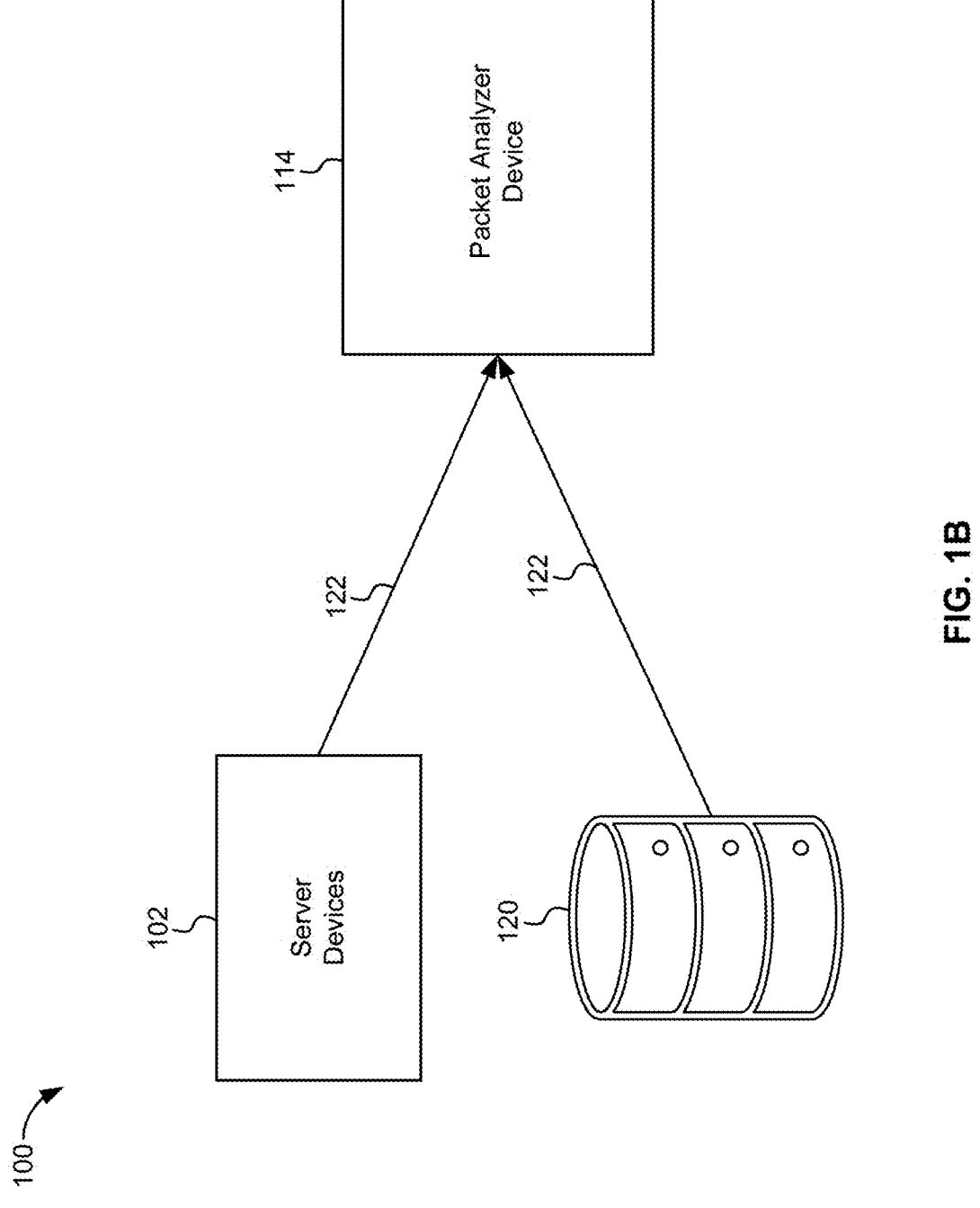

As depicted in FIG. 1B, the packet analyzer device 114 receives input packets 122 representing a history of baseline packets. In some examples, the packet analyzer device 114 may receive the input packets 122 from the server devices 102. In some other examples, the packet analyzer device 114 may receive the input packets 122 from an external database 120.

In some implementations, the packet analyzer device 114 may receive, for example, hundreds, thousands, millions, billions, or more input packets 122 ingested in a sequence. The input packets 122 may include historical OT data associated with the OT network 110. The historical OT data may identify the components, for example, the controller 116 and/or the non-networking equipment 118, of the OT network 110, applications, configurations, and/or the like. In some examples, the historical OT data may include configuration data used for configuring or managing configurations of the controller 116 and/or the non-networking equipment 118 of the OT network 110 (e.g., a maximum/minimum operating temperature, a maximum/minimum operating pressure, a rate of speed of a conveyor belt, and/or the like). In some other examples, the historical data may include commands for operating the controller 116 and/or the non-networking equipment 118 of the OT network 110. In some other examples, the historical data may include codes deployed on the controller 116 and/or the non-networking equipment 118 of the OT network 110. In some other examples, the historical data may include data associated with an industrial process (e.g., setpoints, error data, fault data, alarm data, temperature data, pressure data, flow data, power condition data, environmental condition data, shock data, and/or vibration data, among other examples), and/or the like. In some other examples, the historical data may include active directory logs, group policy logs, domain name system logs, message logs, and/or threat feeds (e.g., a data feed that contains information associated with a security threat, such as an identity of the controller 116 and/or the non-networking equipment 118 of the OT network 110, and/or a user associated with an attack, a location from which an attack is launched, and/or a type of attack (e.g., a denial of service attack), and/or the like). In some other examples, the historical IT data may include personnel data, location data, access data, and/or the like. The personnel data may include information identifying a type of access (e.g., unrestricted, restricted, restricted to a particular application, and/or the like) associated with a user accessing the OT network 110, a role associated with the user (e.g., a supervisor, an employee, and/or the like), a department or business unit associated with the user (e.g., maintenance, IT, administration, and/or the like), an application the user is authorized to utilize, a function the user is responsible to perform, a location of a workspace associated with a user (e.g., a main office, a satellite office, a home office, and/or the like), and/or a work schedule (e.g., Monday through Friday, between 8:00 am and 5:00 pm, and/or the like) associated with the user, and/or the like. The access data may include information associated with the user accessing the OT network 110. For example, the access data may include information identifying a point of entry through which the user accessed the OT network 110, an access technology (e.g., Internet, Wireless, Ethernet, external direct link, and/or the like) associated with the user accessing the OT network 110, a function (e.g., generating a report, collecting sensor data, changing a configuration of the controller 116 and/or the non-networking equipment 118 in the OT network 110, executing a test of the controller 116 and/or the non-networking equipment 118 in the OT network 110, altering or downloading a file, and/or the like) performed by the user, an amount of time for which the user accessed the OT network 110, and/or the like.

Figure 1C:
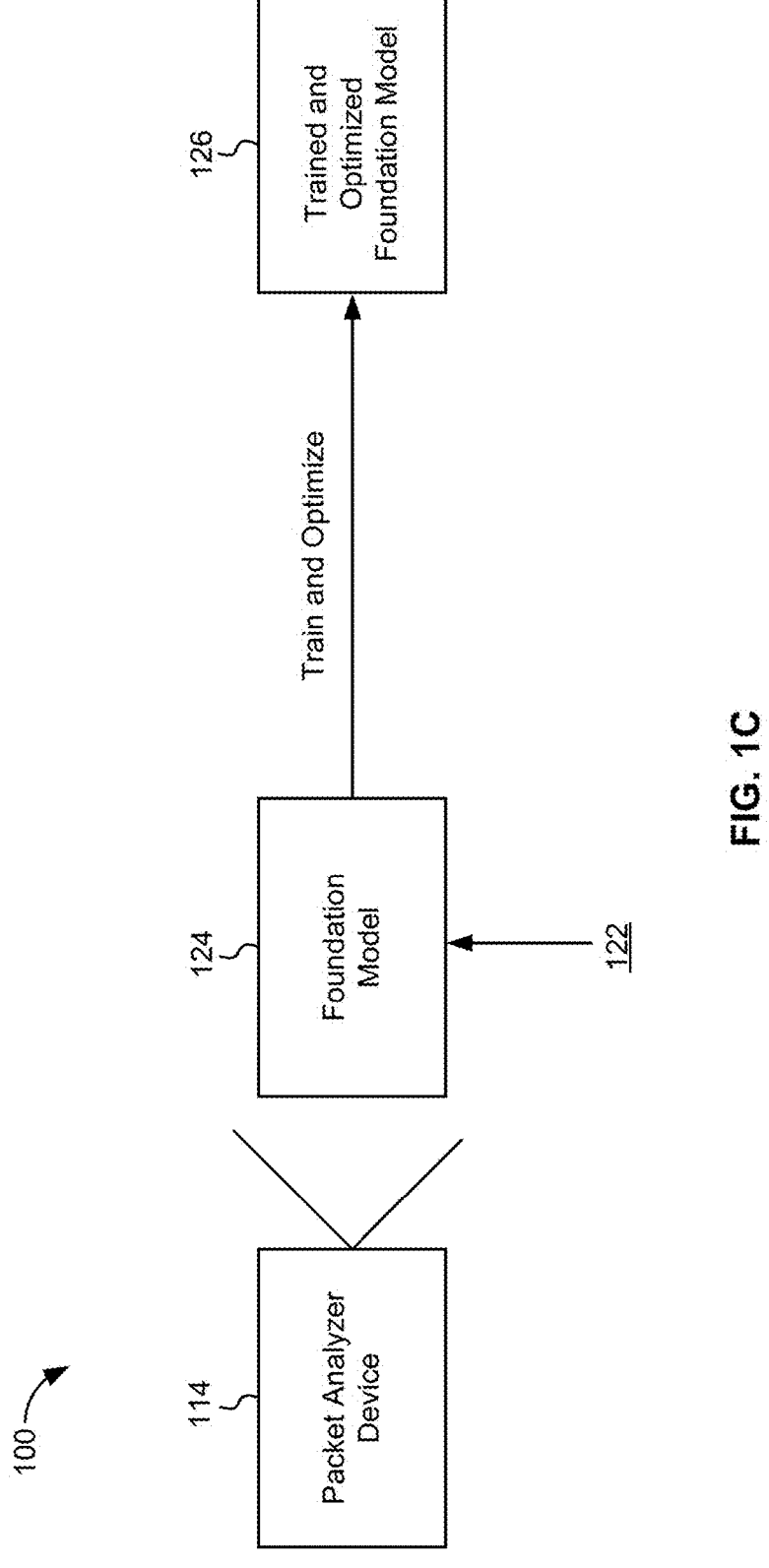

Upon receiving the input packets 122, the packet analyzer device 114 trains and optimizes a foundation model 124, as depicted in FIG. 1C. The foundation model 124 may be hosted by a hosting infrastructure. An example of the hosting infrastructure may include a cloud computing platform or the like. In some examples, the hosting infrastructure may host the foundation model 124 in different types of paradigms, which include, without limitation, model-as-a service (MaaS) models, specialized MaaS (SMaaS) models, self-deployed models, and/or the like.

In some examples, the foundation model 124 may be described as a general-purpose Gen AI model like a large deep learning neural network. The large deep learning neural network may be trained using a broad range of generalized, unlabeled training data and that may perform one or more intended functions according to the present disclosure. The foundation model 124 may include a Large Language Model (LLM). The LLM may be described as an advanced type of language model that is trained using deep learning techniques on text data. The LLM may generate human-like text and perform various Natural Language Processing (NLP) tasks (for example, translation, question-answering, and/or the like). In some examples, the LLM refers to models that use deep learning techniques and have a plurality of parameters, which may range from millions to billions. The LLM may capture complex patterns in language and produce text that is often indistinguishable from that written by humans. The produced text may be processed through a deep learning architecture such as, recurrent neural network (RNN), a transformer model, and/or the like.

While implementations of the present disclosure are described in further detail herein with non-limiting reference to the LLM as the example foundation model 124, it is contemplated that implementations of the present disclosure may be realized using any appropriate foundation models or Machine Learning (ML) models, or Artificial Intelligence (AI) models.

The packet analyzer device 114 may train the foundation model 124 to generate recreated packets corresponding to the input packets 122. Each of the recreated packets may correspond to a unique input packet. Upon training the foundation model 124, the packet analyzer device 114 may optimize the foundation model 124 by minimizing a difference between the input packets 122 and the corresponding recreated packets, thereby resulting in a trained and optimized foundation model 126. Training and optimizing the foundation model 124 is described in detail in conjunction with FIGS. 3 and 4A-4C.

Figure 1D:
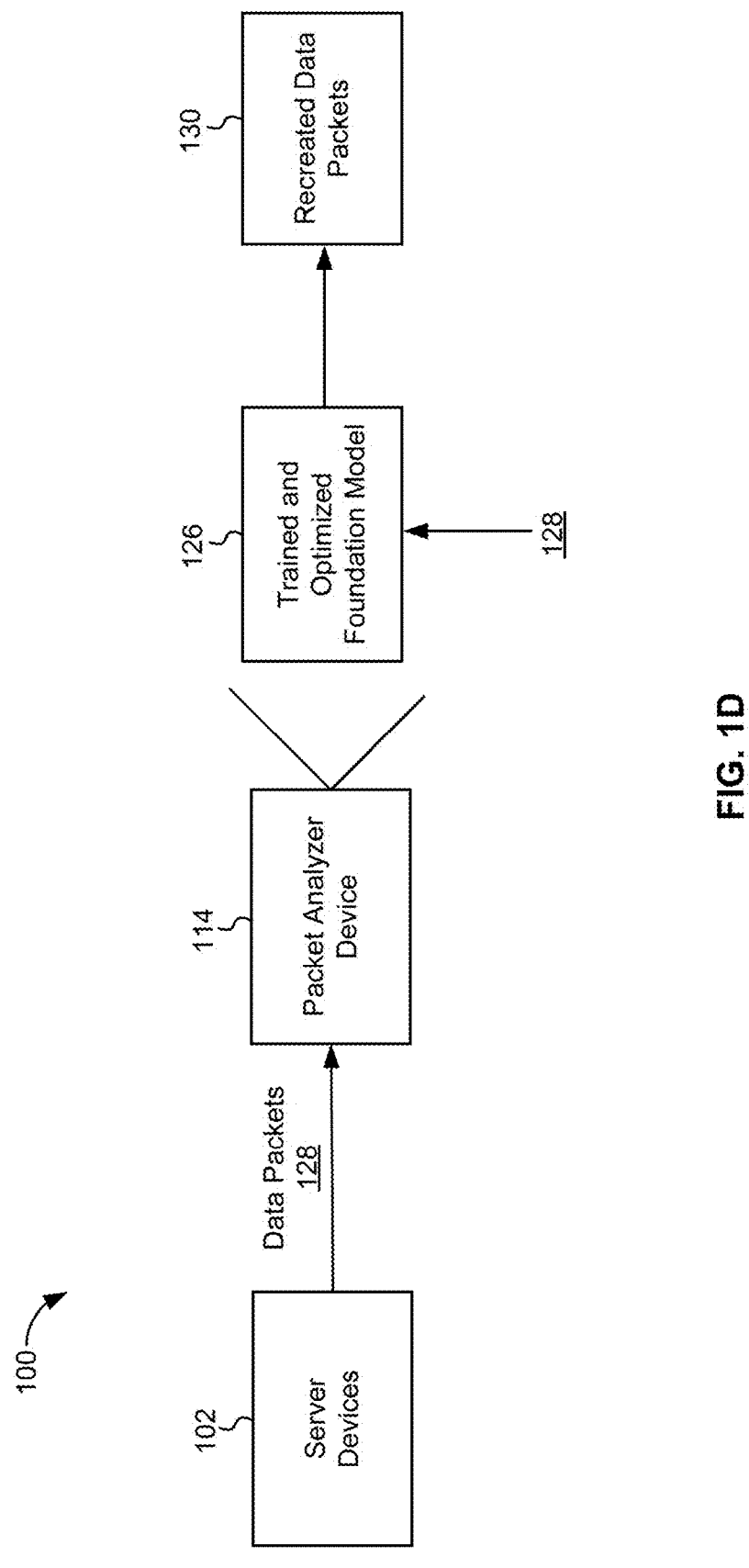

As depicted in FIG. 1D, the packet analyzer device 114 further receives incoming data packets 128 on the OT network 110. The packet analyzer device 114 may receive the incoming data packets 128 from the server devices 102. In some examples, the received incoming data packets 128 may be data packets for configuring the components (e.g., the controller 116 and the non-networking equipment 118) of the OT network 110, code deployment, application execution, accessing the components of the OT network 110, and/or the like.

Upon receiving the incoming data packets 128, the packet analyzer device 114 generates recreated data packets 130 corresponding to the incoming data packets. The packet analyzer device 114 may generate the recreated data packets 130 by analyzing each of the incoming data packets in a sequence using the trained and optimized foundation model 126.

Figure 1E:
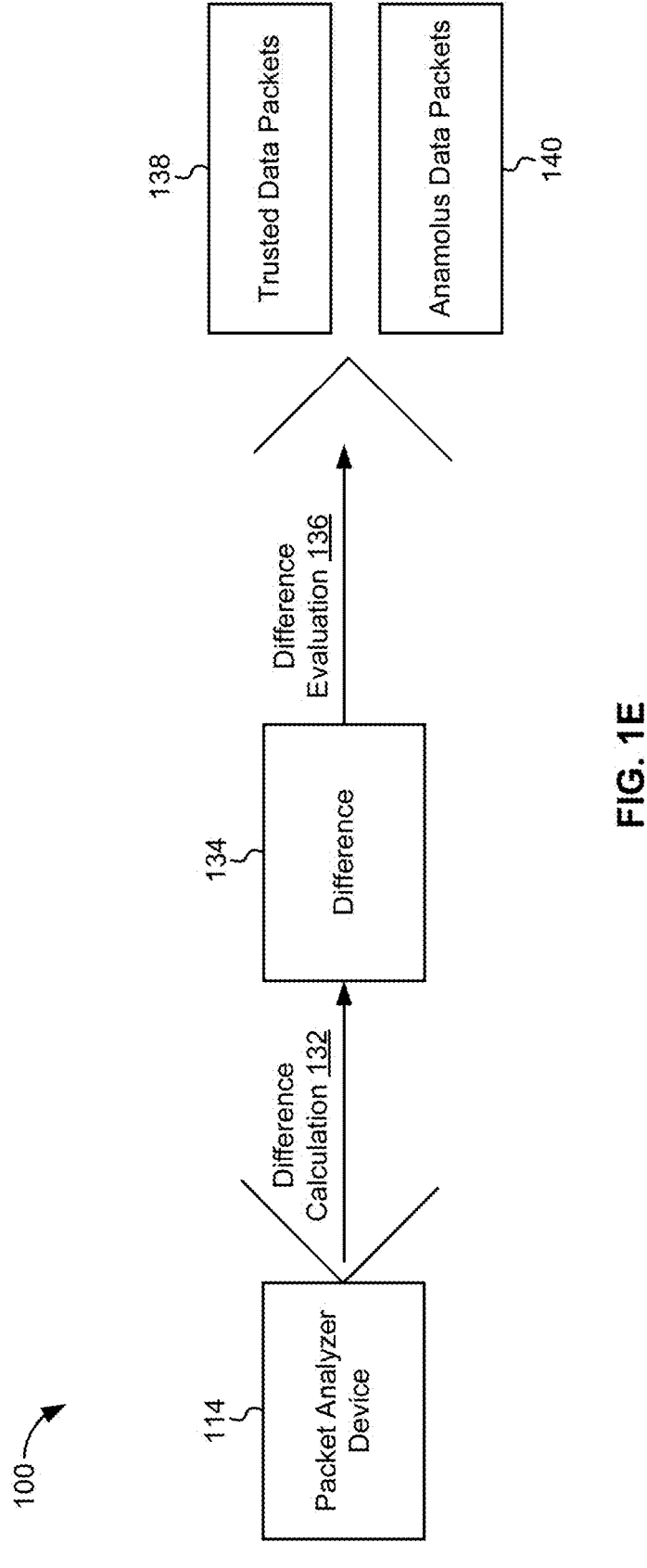
Figure 1G:
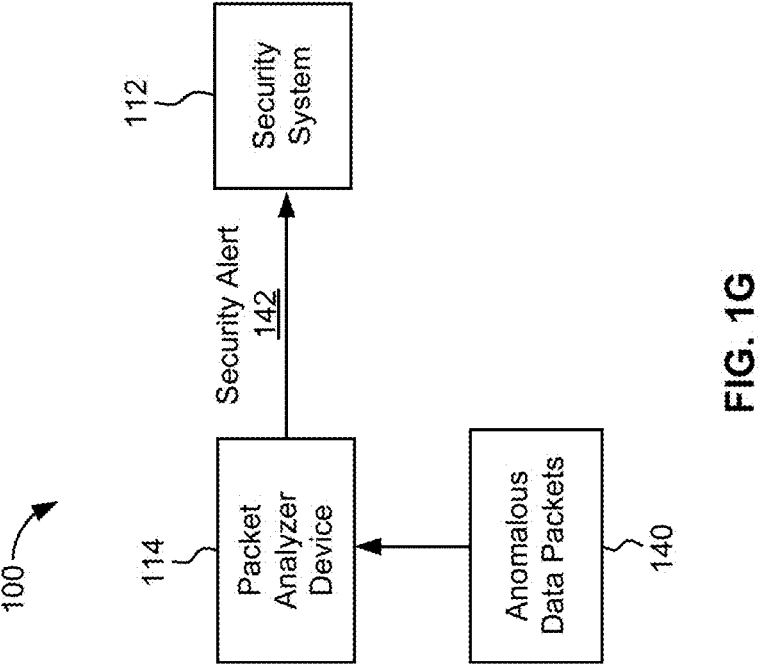
Figure 1F:
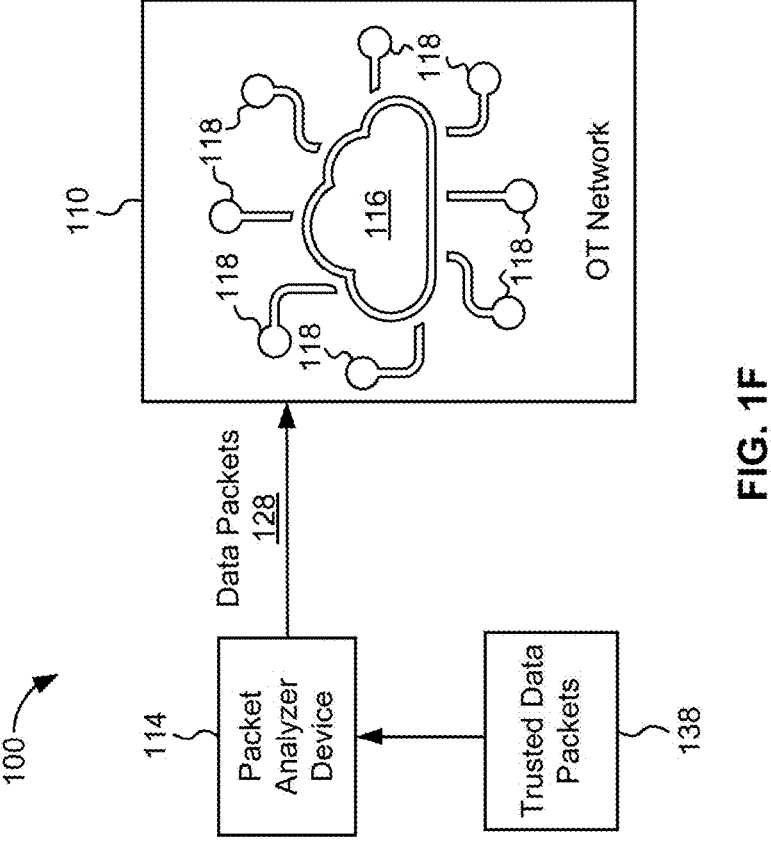

Further, as depicted in FIG. 1E, the packet analyzer device 114 performs a difference calculation 132 to calculate a difference 134 between the recreated data packets 130 and the corresponding incoming data packets 128. The packet analyzer device 114 further performs a difference evaluation 136 based on the calculated difference 134. The difference evaluation 136 includes determining if the difference 134 is below or above a predetermined threshold. When the difference is below the predetermined threshold, the packet analyzer device 114 identifies the incoming data packets are trusted data packets 138 (e.g., data packets that are safe and legitimate). Subsequently, the packet analyzer device 114 forwards/routes the trusted data packets 138 to the components of the OT network 110, as depicted in FIG. 1F.

When the difference is above the predetermined threshold, the packet analyzer device 114 identifies the incoming data packets are anomalous data packets or malicious data packets 140 (e.g., data packets that are vulnerable to cause security threats on the OT network 110). Subsequently, the packet analyzer device 114 blocks the anomalous data packets 140 from reaching the OT network 110 and generates a security alert 142 for the security system 112, as depicted in FIG. 1G. Upon receiving the security alert 142, the security system 112 may perform one or more actions. In some examples, the one or more actions may include protecting the OT network 110 against the security threats such as malware phishing attempts, or other security risks. In some other examples, the one or more actions may include alerting the associated security team about the anomalous data packets 140, blocking or restricting or removing the anomalous data packets 140, and/or the like.

Various examples depicting the anomaly detection on the OT network 110 is described in detail in conjunction with FIGS. 2-9.

Figure 2:
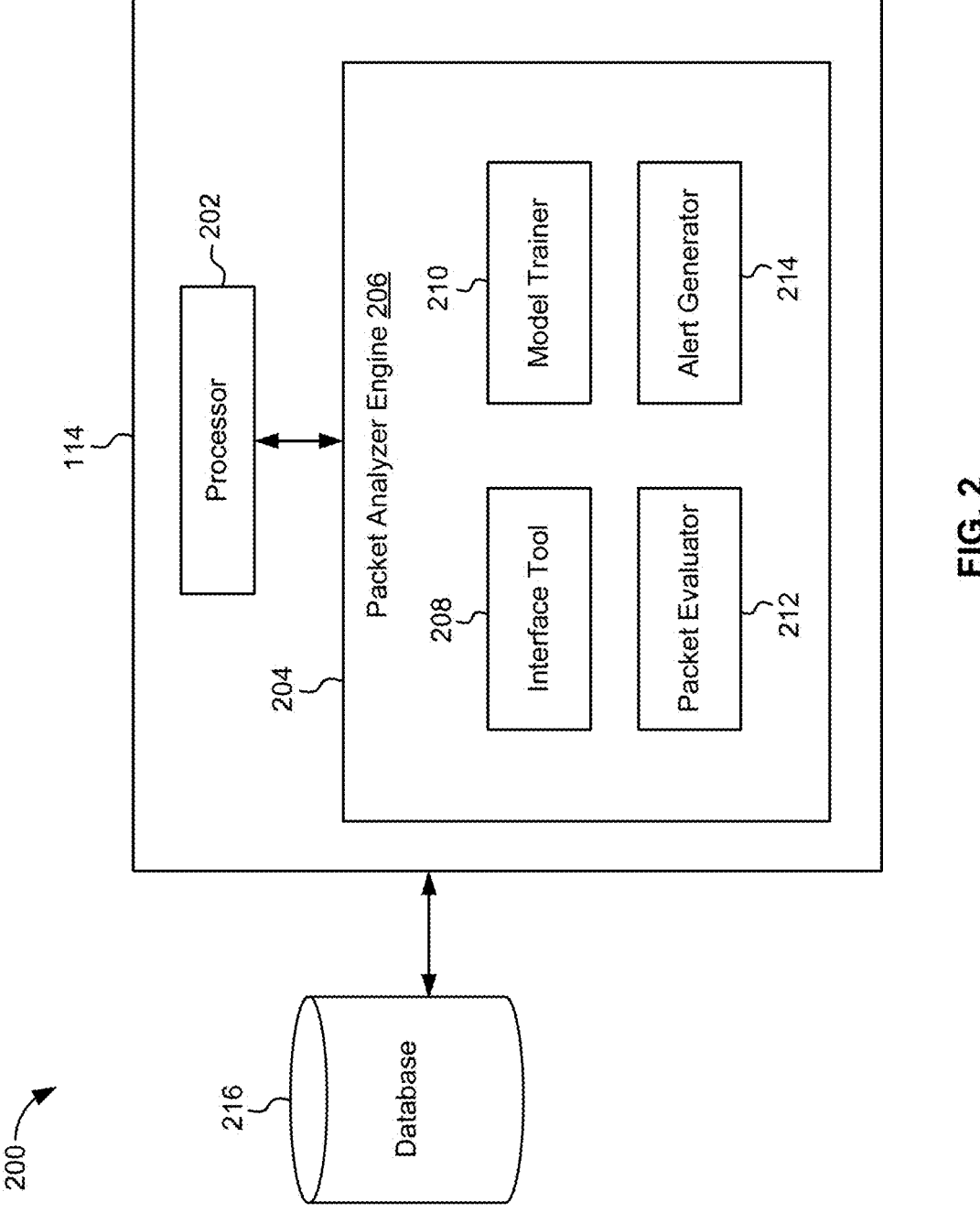
FIG. 2 depicts an example architecture of a packet analyzer device for training and optimizing a foundation model and using the trained and optimized foundation model to evaluate incoming data packets received on an Operational Technology (OT) network, in accordance with implementations of the present disclosure.

FIG. 2 depicts an example architecture 200 of the packet analyzer device 114 for training and optimizing the foundation model 124 and using the trained and optimized foundation model 126 to evaluate incoming data packets received on the OT network 110, in accordance with implementations of the present disclosure.

As depicted in FIG. 2, the packet analyzer device 114 includes a processor 202 and a memory 204. The processor 202 may include one or more processors. Examples of the one or more processors may include, but not limited to, microprocessors, microcomputers, microcontrollers, digital signal processors, central processing units, state machines, logic circuits, Application Specific Integrated Circuits (ASICs), Field Programmable Gate Arrays (FPGAs), and/or any devices that manipulate data or signals based on operational instructions. Among other capabilities, the processor 202 may be programmed to execute computer-readable instructions stored in the memory 204 (also referenced herein as computer-readable storage medium (CRM)) for performing operations according to the present disclosure. The memory 204 may be non-transitory or non-volatile medium, such as a magnetic disk or solid-state non-volatile memory or volatile medium such as Random Access Memory (RAM), and/or the like.

Further, the packet analyzer device 114 includes a packet analyzer engine 206. The packet analyzer engine 206 may be stored in the memory 204 and provided as a downloadable library including the computer-readable instructions. The packet analyzer engine 206 may be configured to generate the trained and optimized foundation model 126 and evaluate the incoming data packets on the OT network 110 using the trained and optimized foundation model 126.

The packet analyzer engine 206 includes an interface tool 208, a model trainer 210, a packet evaluator 212, and an alert generator 214.

The interface tool 208 may obtain the input packets for training the foundation model 124. The input packets may represent a history of baseline packets. The interface tool 208 may receive the input packets from the server devices 102 or the external database(s) 120 (as depicted in FIG. 1B). In some examples, the input packets may be collected over time and stored in a memory of each of the server devices 102 or in the external database(s) 120. In some examples, the input packets may include hexadecimal data. The interface tool 208 may store the obtained input packets in an internal database 216.

The model trainer 210 generates the trained and optimized foundation model 126 by training and optimizing the foundation model 124 based on the input packets representing the history of baseline packets. An example process flow 300 of training and optimizing the foundation model 124 by the model trainer 210 is described in detail along with FIG. 3.

Figure 3:
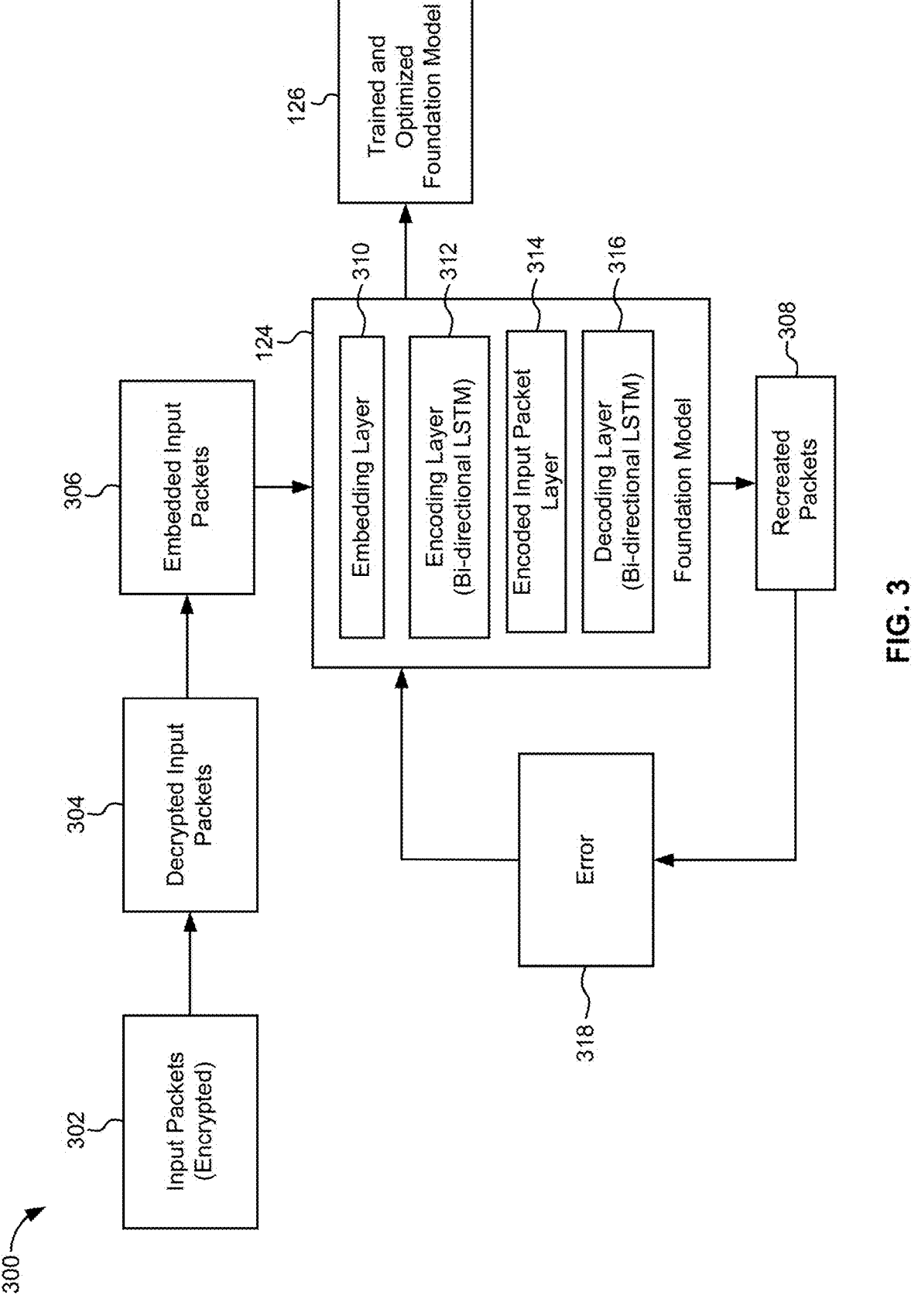
FIG. 3 depicts an example process flow of training and optimizing the foundation model, in accordance with implementations of the present disclosure.
Figures 4A, 4B, 4C:
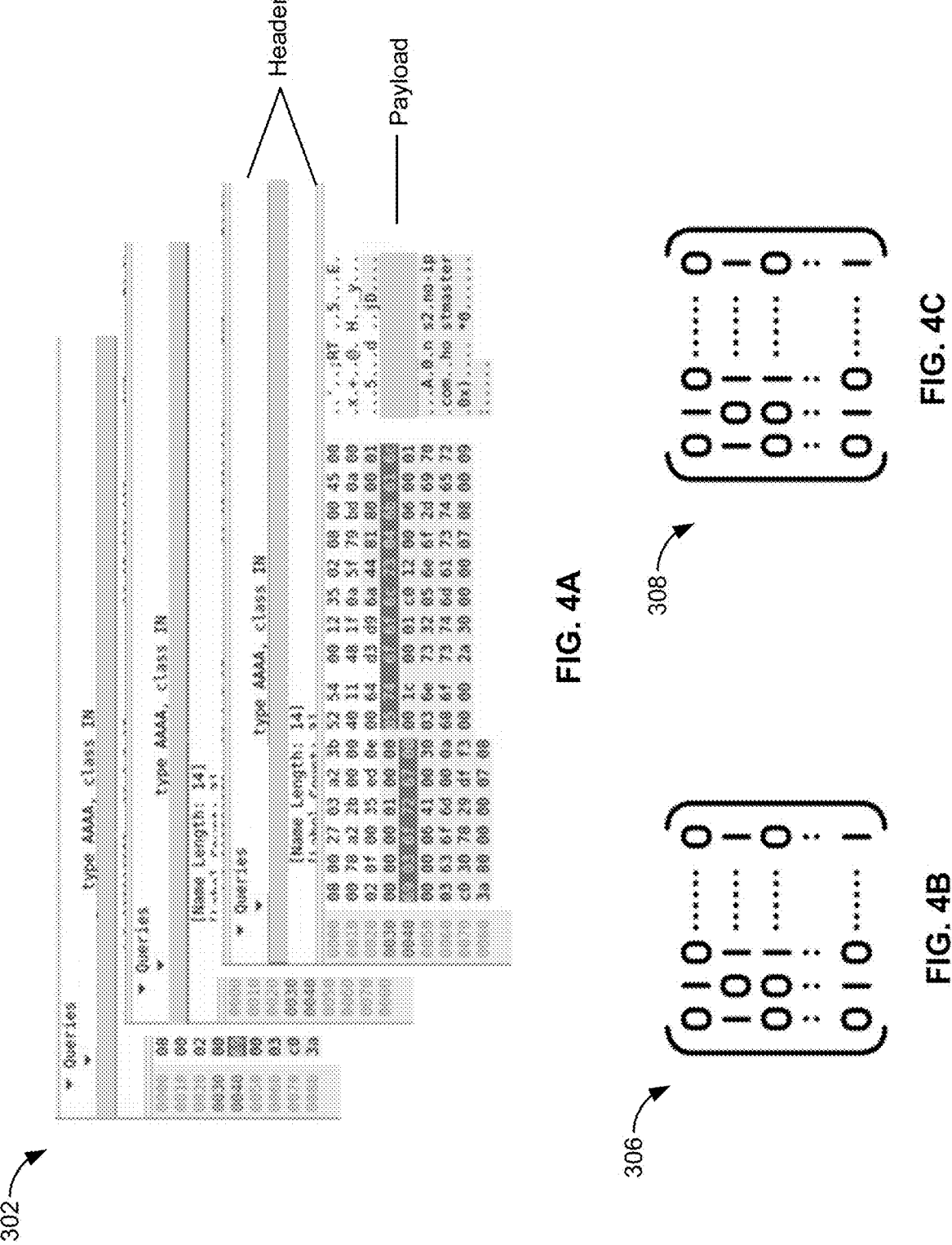
FIGS. 4A, 4B, and 4C depict examples of input packets, embedded input packets, a fixed length vector, respectively, in accordance with implementations of the present disclosure.

As depicted in FIG. 3, the model trainer 210 receives the input packets 302. The input packets 302 may be received from the interface tool 208 or the internal database 216. In an implementation, the received input packets 302 may be unencrypted or pre-decrypted. In some examples, the received input packets 302 may include trusted data packets (e.g., the input packets 302 may not include any malicious codes, malicious setpoint commands/configurations, and/or the like). Each of the input packets 302 may include a header and a payload. The header of each of the input packets 302 may include user/human readable metadata. For example, the header may indicate an origin of a respective input packet, a destination address (e.g., an Internet Protocol (IP) address of a component of the controller 116 for which the respective input packet is intended for), and/or the like. The payload includes actual data. For example, the payload of each of the input packets 302 may include the historical data associated with the OT network 110 (descried in detail in conjunction with FIG. 1B). An example of the input packets 302 is depicted in FIG. 4A.

After receiving the input packets 302 (e.g., unencrypted or pre-decrypted input packets), the model trainer 210 creates embedded input packets 306 (also referenced herein as encoded input packets) corresponding to the input packets 302. The embedded input packets 306 may be created by stripping and combining the header and the payload of each of the respective input packets 302. The embedded input packets 306 may indicate a vector representation/matrix of the input packets 302. An example of the embedded input packets 306 is illustrated in FIG. 4B. The model trainer 210 may create the embedded input packets 306 by independently encoding each of the respective input packets in a sequence. By way of a non-limiting example, the model trainer 210 may use a one-hot encoding method to create encoded input packets. The encoded input packets may be embedded as part of the foundation model 124, thereby generating the embedded input packets 306. The embedded input packets 306 may be used for training of the foundation model 124 to generate recreated packets 308 corresponding to the input packets 302.

In an implementation, the foundation model 124 may act as an auto-encoder having multiple layers. In some examples, the auto-encoder may be described as a neural network that is trained using unsupervised learning by applying backpropagation, where output values are to be equal to input values. For example, during training, the autoencoder may learn a function that enables the input (e.g., the embedded input packets 306 corresponding to the input packets 302) to be recreated as an output (e.g., the recreated packets 308). As depicted in FIG. 3, the foundation model 124 includes an embedding layer 310, an encoding layer 312, an encoded input packet layer 314, and a decoding layer 316. In some examples, the encoding layer 312 may be employed as a bidirectional Long Short-Term Memory (LSTM) encoder and the decoding layer 316 may be employed as a bidirectional LSTM decoder. The encoding layer 312 and the decoding layer 316 may be collectively described as a recurrent neural network (RNN), which enables recreation of each of the input packets 302.

The model trainer 210 may input the embedded input packets 306 corresponding to the input packets 302 to the foundation model 124. The embedded input packets 306 may be embedded in a multi-dimensional vector space using the embedding layer 310. The embedded input packets 306 represented in the multi-dimensional vector space may be further encoded into a fixed length vector using the encoding layer 312 and the encoded input packet layer 314. The fixed length vector may be decoded using the decoding layer 316 to generate the recreated packets 308 corresponding to the input packets 302. An example of the recreated packets 308 in a form of the fixed length vector is depicted in FIG. 4C.

Once the recreated packets 308 are generated, the model trainer 210 may determine an error 318. The error 318 may be also collectively referenced herein as differences between the respective recreated packets 308 and input packets 302. In some examples, the error 318 may be determined based on a mean-square-error (MSE) value. A high MSE value for the error 318 may indicate a large difference between a recreated packet and a respective input packet. A low MSE value for the error 318 may indicate a small difference between the recreated packet and the respective input packet. The model trainer 210 compares the error 318 with a threshold training error. The threshold training error may be baselined during training of the foundation model 124 based on training auto encoder MSE scores. If the error 318 is below the threshold training error, the model trainer 210 stops the training of the foundation model 124. If the error 318 exceeds the threshold training error, the model trainer 210 adjusts parameters/hyperparameters of the foundation model 124 and continues the training of the foundation model 124 (as described above). Examples of the parameters/hyperparameters may include a number of nodes, an activation function, a learning rate, a batch size, an epoch, and/or the like.

In some examples, training of the foundation model 124 may be continued or iteratively performed until the error 318 is minimized across the input packets 302 and the respective recreated packets 308. Iterative training of the foundation model 124 may generate the trained and optimized foundation model 126. The trained and optimized foundation model 126 may be used for evaluation of incoming data packets received on the OT network 110 in a real-time.

Referring back to FIG. 2, the packet evaluator 212 receives incoming data packets on the OT network 110 in the real-time for evaluation. The packet evaluator 212 may receive the incoming data packets from the server devices 102 through the interface tool 208. The packet evaluator 212 further evaluates whether the incoming data packets are the trusted data packets or the anomalous data packets. In an implementation herein, the packet evaluator 212 may evaluate each of the incoming data packets individually (instead of evaluating all the incoming data packets in a session), as it may be difficult to determine a start and an end of long sequence patterns of the incoming data packets when the packet evaluator 212 fails to read the payload of each of the incoming data packets. When it has been determined that the incoming data packets are the trusted data packets, the packet evaluator 212 transmits the incoming data packets to a designated destination. The designated destination may include any of the controller 116 and/or the non-networking equipment 118 of the OT network 110. When it has been determined that the incoming data packets are the anomalous data packets, the alert generator 214 triggers a security protocol by blocking transmission of the incoming data packets to the designated destination. Evaluation of an incoming data packet by the packet evaluator 212 is described in detail in conjunction with FIG. 5.

Figure 5:
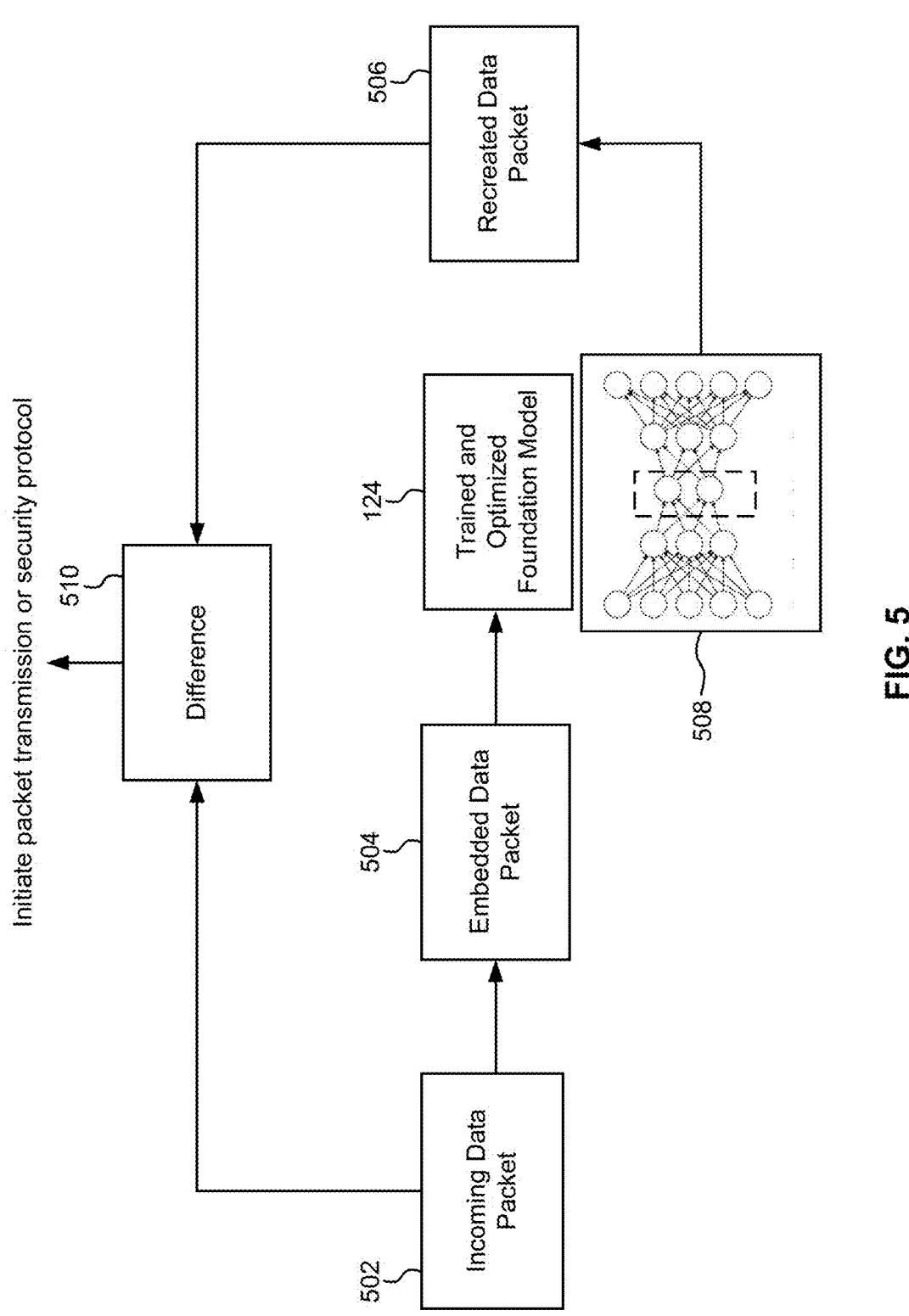
FIG. 5 depicts an example illustration of evaluating an incoming data packet received on the OT network, in accordance with implementations of the present disclosure.
Figures 6A, 6B, 6C:
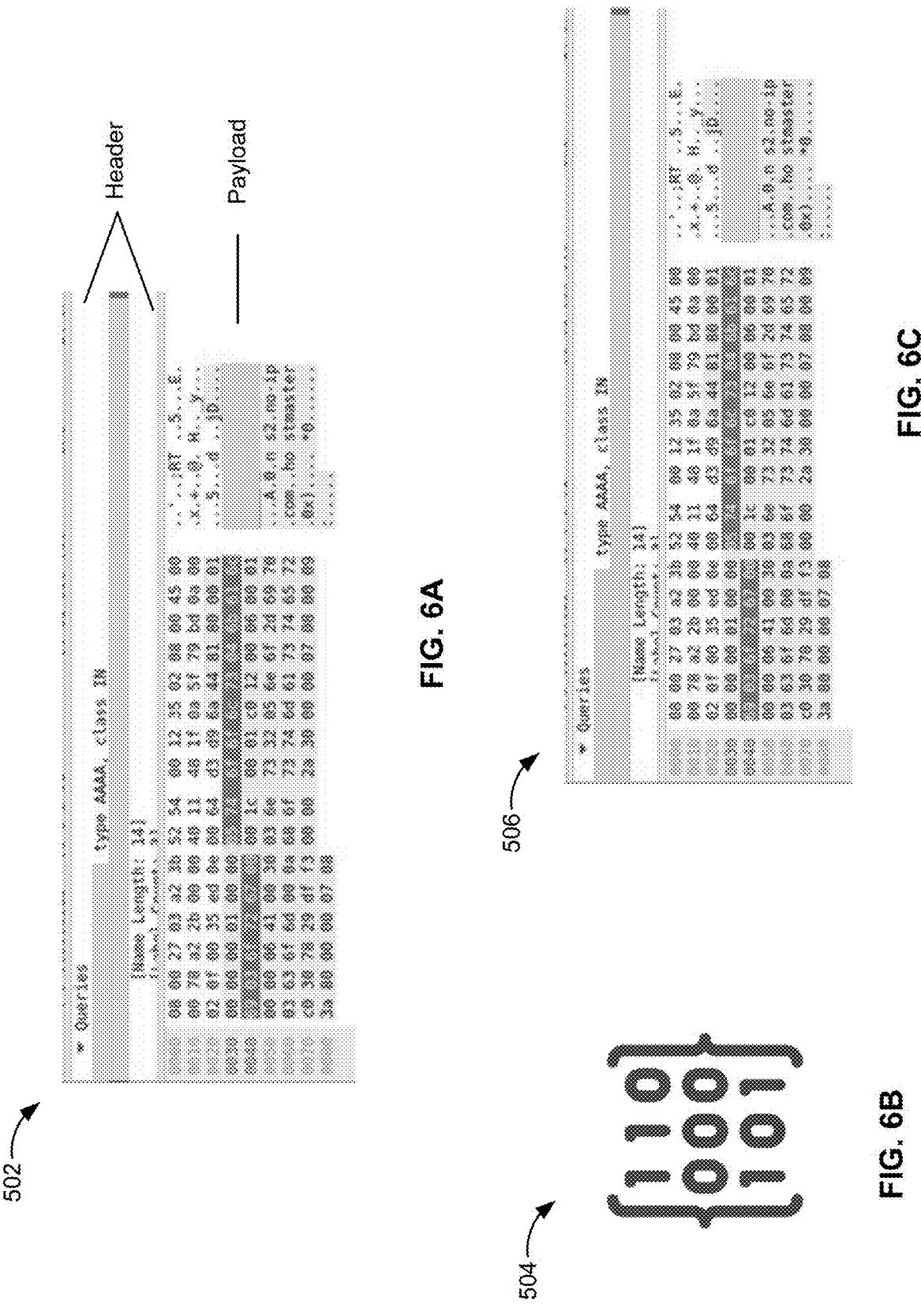
FIGS. 6A, 6B, and 6C depict examples of an incoming data packet, an embedded data packet, and a recreated data packet, respectively, in accordance with implementations of the present disclosure.

As depicted in FIG. 5, the packet evaluator 212 receives an incoming data packet 502 intended for the controller 116 and/or the non-networking equipment 118 of the OT network 110. In an example, the incoming data packet may include a configuration for the controller 116 (e.g., PLC) of the OT network 110. In another example, the incoming data packet may include a code to be deployed on the controller 116 of the OT network 110. In yet another example, the incoming data packet may include a setpoint commands for the non-network equipment 118 of the OT network 110. The incoming data packet may include the header, the payload, and/or metadata including the actual data (e.g., the configuration, the code, the setpoint commands, and/or the like). In some examples, the actual data may include hexadecimal data, which may be hard for human to decode or reverse engineer. In some examples, the hexadecimal data may include long sequence patterns. An example of the incoming data packet 502 including the hexadecimal data is depicted in FIG. 6A.

Upon receiving the incoming data packet 502, the packet evaluator 212 determines that the incoming data packet 502 is unencrypted or pre-decrypted. Upon the determination, the packet evaluator 212 converts the incoming data packet (e.g., raw text) into an embedded data packet 504. An example of the embedded data packet 504 is depicted in FIG. 6B. The embedded data packet 504 may indicate a vector representation (also be referred to as vector embedding, matrix, and/or the like). By way of a non-limiting example, the packet evaluator 212 may use one-hot encoding method to convert the incoming data packet into an encoded data packet, which may be embedded as part of the trained and optimized foundation model 126, thereby generating the embedded data packet 504.

Based on the embedded data packet 504, the packet evaluator 212 generates a recreated data packet 506 corresponding to the incoming data packet 502. The packet evaluator 212 generates the recreated data packet 506 by processing the embedded data packet 504 using the trained and optimized foundation model 126. To illustrate, the packet evaluator 212 may input the embedded data packet 504 to the trained and optimized foundation model 126. The embedded data packet 504 may be further transformed into a reduced representation/central embedding 508 using an embedding layer of the trained and optimized foundation model 126. The reduced representation/central embedding 508 may be further converted into a fixed length vector using an encoding layer and an encoded input packet layer of the trained and optimized foundation model 126. Further, the fixed length vector may be decoded using a decoding layer of the trained and optimized foundation model 126 to generate the recreated data packet 506. An example of the recreated data packet 506 is depicted in FIG. 6C.

Once the recreated data packet 506 corresponding to the incoming data packet 502 is generated, the packet evaluator 212 evaluates whether the incoming data packet 502 is the trusted data packet or the anomalous data packet. For the evaluation, the packet evaluator 212 calculates a difference 510 between the recreated data packet 506 and the incoming data packet 502. In some examples, the difference may be calculated as an MSE value. The difference may indicate an error score. As the trained and optimized foundation model 126 is generated by training and optimizing the foundation model 124 using the history of baseline input packets, the recreated data packet may be generated with a low difference/error score using the trained and optimized foundation model 126 when the incoming data packet is the trusted data packet. If the incoming data packet is anomalous/unfamiliar data packet (e.g., that is not used in training of the foundation model 124), the recreated data packet may be generated with a high difference/error using the trained and optimized foundation model 126.

The packet evaluator 212 may compare the difference with a predetermined threshold. The threshold may be predetermined during training of the foundation model 124 to generate the trained and optimized foundation model 126. The threshold may be predetermined during training of the foundation model 124 based on training autoencoder MSE scores. If the difference 510 is below the predetermined threshold, the packet evaluator 212 determines that the incoming data packet 502 is the trusted data packet. On determining that the incoming data packet is the trusted data packet, the packet evaluator 212 initiates packet transmission to transmit the incoming data packet to the controller 116 and/or the non-networking equipment 118 of the OT network 110. Also, the packet evaluator 212 stores the incoming data packet 502 (e.g., the trusted data packet) in the internal database 216. The stored incoming data packet 502 may be used by the model trainer 210 to further train the foundation model 124 in a subsequent training cycle.

If the difference 510 is above the predetermined threshold, the packet evaluator 212 determines that the incoming data packet 502 is the anomalous data packet. On determining that the incoming data packet is the anomalous data packet, the alert generator 214 triggers a security protocol to the security system 112. The security protocol may include providing the security alert (also be referred to as alert) to the security system 112. The security alert may be for further evaluation of the incoming data packet 502 by a security team associated with the security system 112, blocking/removal of the incoming data packet 502, and/or the like.

Figure 7:
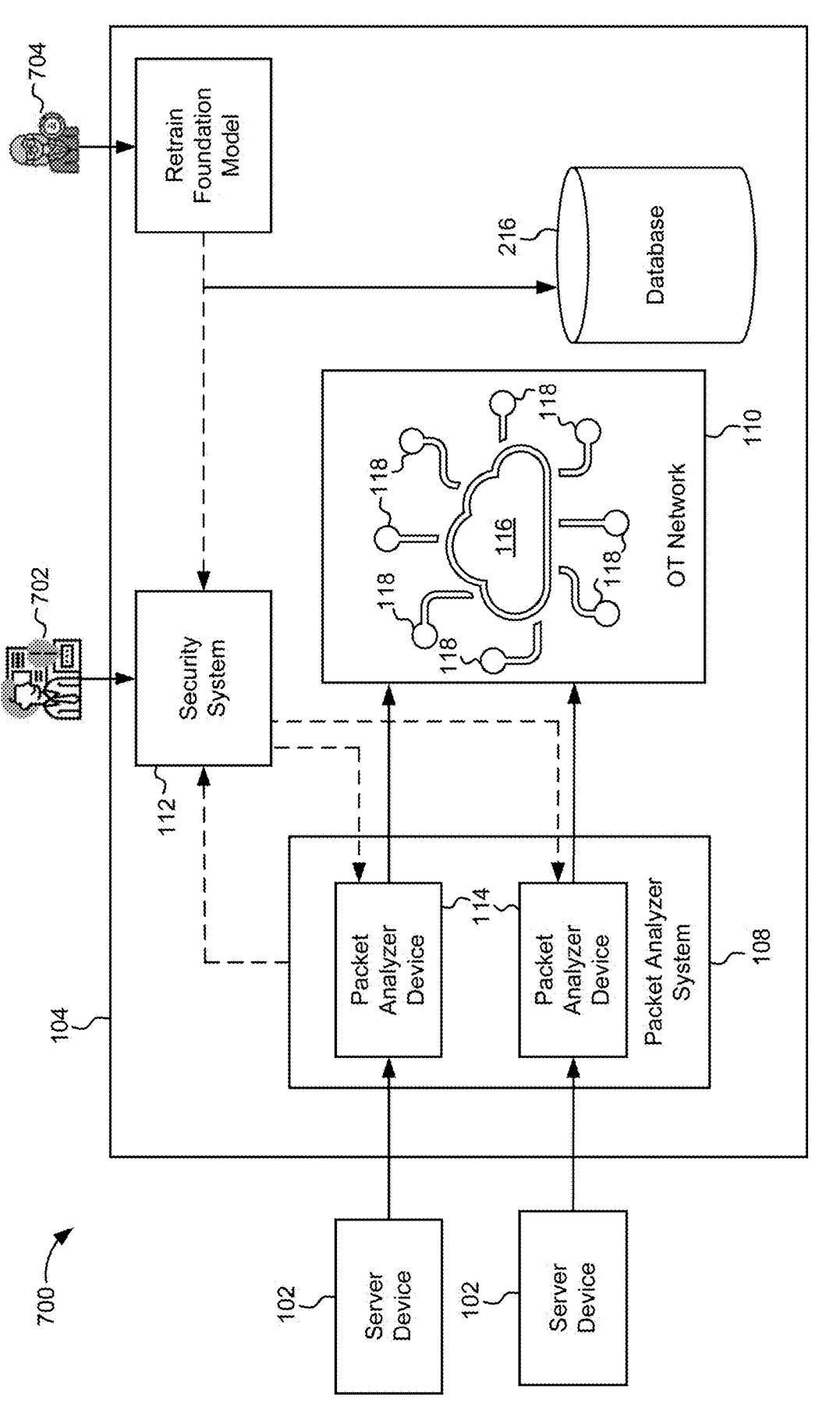
FIG. 7 depicts an example illustration of performing anomaly detection on the OT network, in accordance with implementations of the present disclosure.

FIG. 7 depicts an example illustration of performing the anomaly detection on the OT network 110, in accordance with implementations of the present disclosure. The system 104 includes the packet analyzer devices 114 between the server devices 102 and the OT network 110. The packet analyzer devices 114 may listen incoming data packets from the server devices 102 and evaluates the incoming data packets before transmitting the incoming data packets to the OT network 110.

As depicted in FIG. 7, the packet analyzer devices 114 receive the incoming data packets from the respective server devices 102, for example, an HMI interface, and an engineering workstation. In an example, an incoming data packet received from one of the server devices 102 like the HMI interface may include configurations for the controller 116 (e.g., a PLC) of the OT network 110. In another example, an incoming data packet received from one of the server devices 102 like the engineering workstation may include code for deployment.

Upon receiving the incoming data packets, the packet analyzer devices 114 use the trained and optimized foundation model 126 and generate the recreated data packets corresponding to the incoming data packets. Further, the packet analyzer devices 114 calculate differences between the respective incoming data packets and recreated data packets. If the differences between the respective incoming data packets and recreated data packets are below the predetermined threshold, the packet analyzer devices 114 initiate transmission of the incoming data packets to respective designated destinations. For example, the packet analyzer devices 114 may transmit the incoming data packets including the configurations and the code received from the respective server devices 102 to the controller 116 of the OT network 110.

If the differences between the respective incoming data packets and the recreated data packets are above the predetermined threshold, the packet analyzer devices 114 initiate or trigger the security protocol/security alert to the security system 112, while blocking transmission of the incoming data packets to the OT network 110. Therefore, malicious data traffic may be prevented on the OT network 110. The security alert may include a copy of each of the incoming data packets, a copy of the security alert generated for each of the incoming data packets, and/or the like.

Upon receiving the security alert, the security system 112 performs an investigation or allows a security team 702 associated with the security system 112 to perform the investigation on the incoming data packets for which the security alert has been generated. The investigation may include determining whether the generated security alert is true positive (TP) or false positive (FP). If the generated security alert is false positive, the security system 112 may transmit the incoming data packets to the OT network 110 by identifying that the security alert has been generated due to a fault in the trained and optimized foundation model 126. If the generated security alert is true positive, the security system 112 may perform one or more actions to block or remove the corresponding incoming data packets. Also, the security system 112 may store the security alert along with an investigation report in the database 216. The investigation report may provide a label indicating the true positive or the false positive for the security alert generated for each of the incoming data packets. If the security alert includes the false positive, the associated incoming data packet may be used for training of the foundation model 124.

In some implementations, the packet analyzer devices 114 may also receive inputs from the security system 112 or a cyber security platform 704 for initiating retraining of the foundation model 124. The inputs may include new input packets with labels (e.g., true positives or false positives) for initiating retraining of the foundation model 124. For example, the inputs may be received from the cyber security platform 704 based on results of historical analysis performed by the cyber security platform 704 on the incoming data packets. For another example, the inputs may be received from the security system 112 or the cyber security platform 704 when a new/updated foundation model is employed for evaluating the incoming data packets. In such a scenario, one of the packet analyzer devices 114 may initiate training of the new/updated foundation model, as described in detail in conjunction with FIG. 3.

FIG. 8 is a flow diagram that presents an example computer implemented method 800 for anomaly detection on the OT network 110, in accordance with implementations of the present disclosure. In some implementations, the method 800 may be executed by the processor 202 (including the one or more processors), as described in relation to FIGS. 2-7.

The method 800 includes obtaining 802 input packets. The input packets may represent a history of baseline packets, which include the trusted data packets collected over time.

The method 800 includes training 804 the foundation model 124 to generate recreated packets based on the input packets. Each of the corresponding recreated packets may be based on a unique one of the input packets. For training the foundation model 124, the method 800 may include determining that the input packets include unencrypted input packets or pre-encrypted input packets. Further, the method 800 may include generating embedded input packets corresponding to the input packets. Each of the embedded input packets may correspond to one of the input packets. In some examples, generating the embedded input packets may include transforming the input packets into a vector representation. After generating the embedded input packets, the method 800 may include training the foundation model 124 to generate the recreated packets based on the embedded input packets.

Upon training the foundation model 124, the method 800 includes optimizing 806 the foundation model 124 by minimizing a difference between the input packets and the corresponding recreated packets. Thereby, the trained and optimized foundation model 126 may be generated. Training and optimizing the foundation model 124 is described in detail in conjunction with FIGS. 3 and 4A-4C, therefore repeated description is omitted for a sake of brevity.

The method 800 includes receiving 808 an incoming data packet on the OT network 110. The incoming data packet may be intended for the controller 116 and/or the non-networking equipment 118 of the OT network 110. The incoming data packet may include the header/metadata and the payload including actual data. The actual data may include codes, configurations, setpoint commands, and/or the like. In some examples, the incoming data packet may include hexadecimal data.

The method 800 includes generating 810, using the trained and optimized foundation model 126, a recreated data packet based upon the incoming data packet. For generating 810 the recreated data packet, the method 800 may include determining that the incoming data packet is unencrypted or pre-encrypted and generating an embedded input packet corresponding to the incoming data packet. Based upon the embedded data packet, the method 800 may further include generating the recreated data packet.

The method 800 includes calculating 812 a difference between the recreated data packet and the incoming data packet. The difference may be created as an MSE value. The method 800 includes determining 814 if the difference is above a predetermined threshold. If the difference is below the predetermined threshold, the method 800 includes initiating 816 transmission of the incoming data packet to the designated destination. The designated destination may be the controller 116 and/or the non-networking equipment 118 of the OT network 110.

If the difference is above the predetermined threshold, the method 800 includes triggering 818 the security protocol. Triggering 818 the security protocol may include providing an alert (e.g., the security alert) to the security system 112.

Implementations of the present disclosure provide technical solutions to multiple technical problems that arise in the context of threat detection. The proposed methodology evaluates whether the incoming data packet received on the OT network is trusted or anomalous data packet by leveraging an auto-encoder deep learning architecture of the foundation model trained based on baseline trusted data packets. Therefore, the trusted or anomalous data packet may be detected with improved accuracy, confidence level, rate of true positives, and/or the like. This, in turn, may improve response time, conserve computing resources, networking resources, human resources, and/or the like that would otherwise have been overutilized in generating false positive and false negative security alerts, unnecessarily addressing the false positive and false negative security alerts, handling industrial process disruptions caused by the false positive and false negative security alerts and/or undetected actual security issues, and/or the like.

Implementations of the present disclosure further enable efficient evaluation of the incoming data packet including the payload with any long sequence patterns by leveraging the auto-encoder deep learning architecture of the foundation model.

Implementations of the present disclosure further enable the security system to perform a wide variety of reactive measures that improves detection and remediation of potential security threats to the OT network. Therefore, the proposed methodology improves overall security of the OT network, while enhancing threat detection and prevention capabilities.

Overall, the implementations of the present disclosure provide a robust framework for safeguarding the OT network against the security threats and allowing the OT network operates in a safe state.

Figure 9:
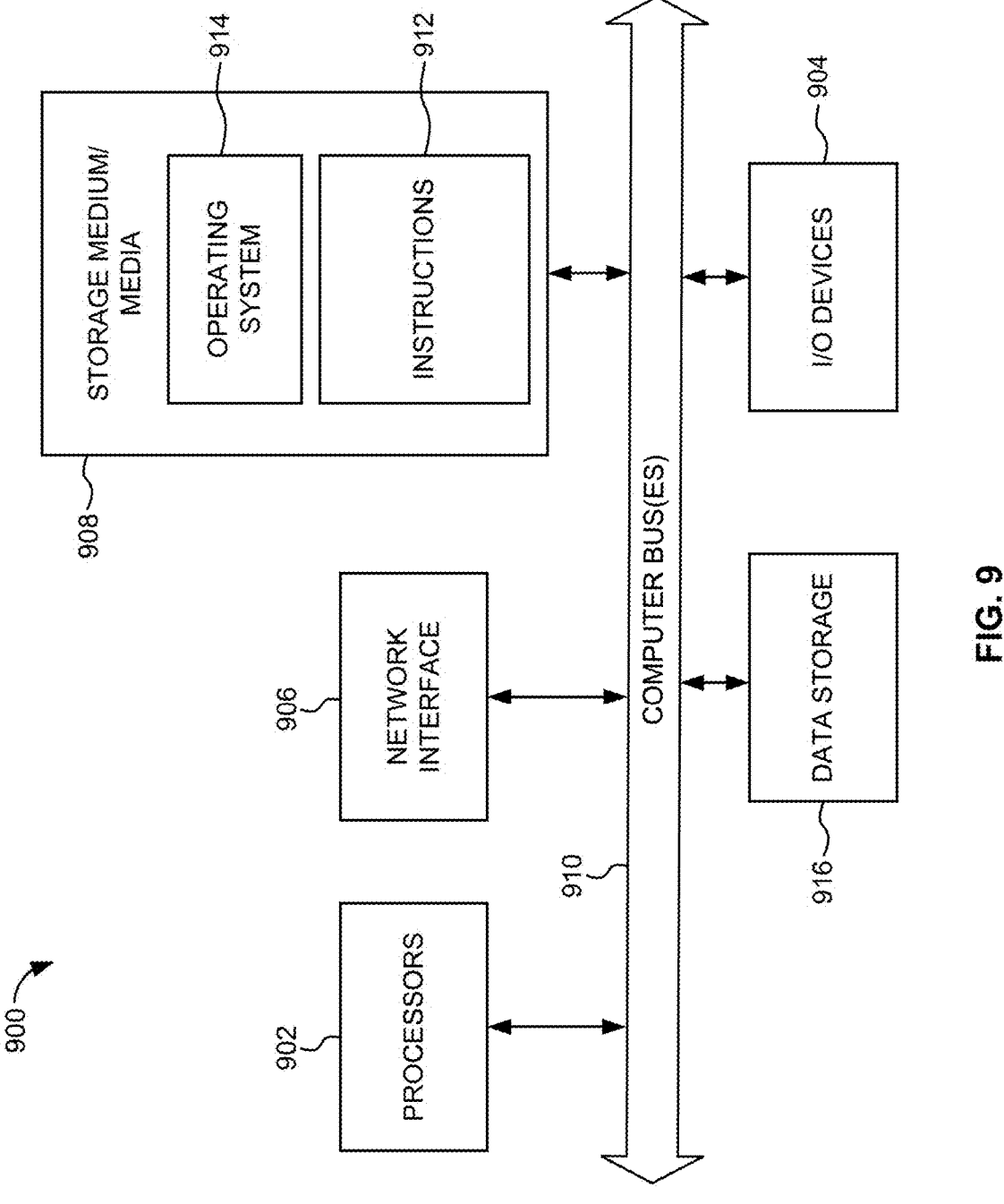
FIG. 9 depicts a computer system that may be used to implement the system, in accordance with implementations of the present disclosure.

FIG. 9 depicts a computer system 900 that may be used to implement the system 104. More particularly, computing machines such as desktops, laptops, smartphones, tablets, and wearables which may be used to perform the anomaly detection on the OT network 110. The computer system 900 may include additional components not shown and that some of the process components described may be removed and/or modified. In another example, a computer system 900 may be deployed on external-cloud platforms such as cloud, internal corporate cloud computing clusters, organizational computing resources, and/or the like.

The computer system 900 includes processor(s) 902, such as a central processing unit, ASIC or another type of processing circuit, input/output devices 904, such as a display, mouse keyboard, etc., a network interface 906, such as a Local Area Network (LAN), a wireless 802.11x LAN, a 3G or 4G mobile WAN or a WiMax WAN, and a computer-readable medium 908. Each of these components may be operatively coupled to a bus 910. The computer-readable medium 908 may be any suitable medium that participates in providing instructions to the processor(s) 902 for execution. For example, the computer-readable medium 908 may be non-transitory or non-volatile medium, such as a magnetic disk or solid-state non-volatile memory or volatile medium such as RAM. The instructions or modules stored on the computer-readable medium 908 may include machine-readable instructions 912 executed by the processor(s) 902 that cause the processor(s) 902 to perform the methods and functions of the system 104.

The system 104 may be implemented as software stored on a non-transitory processor-readable medium and executed by the processor(s) 902. For example, the computer-readable medium 908 may store an operating system 914, such as MAC OS, MS WINDOWS, UNIX, or LINUX, and code, for the system 104. The operating system 914 may be multi-user, multiprocessing, multitasking, multithreading, real-time, and the like. For example, during runtime, the operating system 914 is running and the code for the system 104 is executed by the processor(s) 902.

The computer system 900 may include a data storage 916, which may include non-volatile data storage. The data storage 916 stores any data used or generated by the system 104.

The network interface 906 connects the computer system 900 to internal systems for example, via a LAN. Also, the network interface 906 may connect the computer system 900 to the Internet. For example, the computer system 900 may connect to web browsers and other external applications and systems via the network interface 906.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer may include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor(s) 902 and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer implemented method for anomaly detection on an operational technology network, the method being executed by one or more processors and comprising:
obtaining a plurality of input packets, each of the plurality of input packets representing a history of baseline packets;

training a foundation model to generate a plurality of corresponding recreated packets based on the plurality of input packets, wherein each of the plurality of corresponding recreated packets is based on a unique one of the plurality of input packets;

optimizing the foundation model by minimizing a difference between the plurality of input packets and the plurality of corresponding generated recreated packets;

receiving an incoming data packet on the operational technology network;

generating, using the trained and optimized foundation model, a recreated data packet based upon the incoming data packet;

calculating a difference between the recreated data packet and the incoming data packet;

determining if the difference is above a predetermined threshold; and triggering, when any difference is above the predetermined threshold, a security protocol.

2. The computer implemented method of claim 1, wherein the incoming data packet includes hexadecimal data.

3. The computer implemented method of claim 1, wherein the plurality of input packets comprise unencrypted input packets or pre-decrypted input packets.

4. The computer implemented method of claim 3, further comprising:

generating a plurality of embedded input packets, each of the plurality of embedded input packets corresponds to one of the plurality of input packets, wherein the training the foundation model generates the plurality of corresponding recreated packets based upon the plurality of embedded input packets.

5. The computer implemented method of claim 4, wherein the generating a plurality of embedded input packets transforms the plurality of input packets into a vector representation.

6. The computer implemented method of claim 1, further comprising:

determining that the incoming data packet is unencrypted or pre-decrypted;

generating an embedded data packet corresponding to the incoming data packet; and generating the recreated data packet based upon the embedded data packet.

7. The computer implemented method of claim 1, further comprising:

transmitting the incoming data packet to a designated destination.

8. The computer implemented method of claim 1, wherein the security protocol includes providing an alert to a security system.

9. A system comprising:

at least one memory storing instructions; and at least processor communicatively coupled with the at least one memory and configured to executed instructions to perform operations comprising:

obtaining a plurality of input packets, each of the plurality of input packets representing a history of baseline packets;

training a foundation model to generate a plurality of corresponding recreated packets based on the plurality of input packets, wherein each of the plurality of corresponding recreated packets is based on a unique one of the plurality of input packets;

optimizing the foundation model by minimizing a difference between the plurality of input packets and the plurality of corresponding generated recreated packets;

receiving an incoming data packet on an operational technology network;

generating, using the trained and optimized foundation model, a recreated data packet based upon the incoming data packet;

calculating a difference between the recreated data packet and the incoming data packet;

determining if the difference is above a predetermined threshold; and triggering, when any difference is above the predetermined threshold, a security protocol.

10. The system of claim 9, wherein the incoming data packet includes hexadecimal data.

11. The system of claim 9, wherein the plurality of input packets comprise unencrypted input packets or pre-decrypted input packets.

12. The system of claim 11, wherein the operations further comprising:

generating a plurality of embedded input packets, each of the plurality of embedded input packets corresponds to one of the plurality of input packets, wherein the training the foundation model generates the plurality of corresponding recreated packets based upon the plurality of embedded input packets.

13. The system of claim 12, wherein the generating a plurality of embedded input packets transforms the plurality of input packets into a vector representation.

14. The system of claim 9, wherein the operations further comprising:

determining that the incoming data packet is unencrypted or pre-decrypted;

generating an embedded data packet corresponding to the incoming data packet; and generating the recreated data packet based upon the embedded data packet.

15. The system of claim 9, wherein the operations further comprising:

transmitting the incoming data packet to a designated destination.

16. The system of claim 9, wherein the security protocol includes providing an alert to a security system.

17. A non-transitory computer-readable storage media (CRM) comprising instructions stored thereon, which, when executed by at least one processor of at least one computing device, cause the at least one computing device to perform operations comprising:

obtaining a plurality of input packets, each of the plurality of input packets representing a history of baseline packets;

training a foundation model to generate a plurality of corresponding recreated packets based on the plurality of input packets, wherein each of the plurality of corresponding recreated packets is based on a unique one of the plurality of input packets;

optimizing the foundation model by minimizing a difference between the plurality of input packets and the plurality of corresponding generated packets;

receiving an incoming data packet on an operational technology network;

generating, using the trained and optimized foundation model, a recreated data packet based upon the incoming data packet;

calculating a difference between the recreated data packet and the incoming data packet;

determining if the difference is above a predetermined threshold; and triggering, when any difference is above the predetermined threshold, a security protocol.

18. The non-transitory CRM of claim 17, wherein the plurality of input packets comprise unencrypted input packets or pre-decrypted input packets.

19. The non-transitory CRM of claim 18, wherein the operations further comprising:

generating a plurality of embedded input packets, each of the plurality of embedded input packets corresponds to one of the plurality of input packets, wherein the training the foundation model generates the plurality of corresponding recreated packets based upon the plurality of embedded input packets.

20. The non-transitory CRM of claim 19, wherein the generating a plurality of embedded input packets transforms the plurality of input packets into a vector representation.

* * * * *